(12) United States Patent
Stuart

(10) Patent No.: US 11,665,995 B2
(45) Date of Patent: Jun. 6, 2023

(54) AGITATION CONTROL SYSTEM

(71) Applicant: CNH Industrial Canada, Ltd., Saskatoon (CA)

(72) Inventor: Graham Douglas Stuart, Warman (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 653 days.

(21) Appl. No.: 16/265,266

(22) Filed: Feb. 1, 2019

(65) Prior Publication Data
US 2020/0245542 A1    Aug. 6, 2020

(51) Int. Cl.
| | | |
|---|---|---|
| *A01C 19/00* | (2006.01) | |
| *A01C 15/00* | (2006.01) | |
| *B01F 27/72* | (2022.01) | |
| *B01F 27/1142* | (2022.01) | |
| *B01F 35/21* | (2022.01) | |

(Continued)

(52) U.S. Cl.
CPC ............ *A01C 19/00* (2013.01); *A01C 15/007* (2013.01); *B01F 27/1142* (2022.01); *B01F 27/72* (2022.01); *B01F 35/2112* (2022.01); *B01F 35/2209* (2022.01); *B01F 35/221422* (2022.01); *B01F 2101/09* (2022.01)

(58) Field of Classification Search
CPC ........ B01F 15/00129; B01F 2215/0013; B01F 35/2209; B01F 27/1142; B01F 35/2112; B01F 2101/09; A01C 19/00; A01C 15/007
See application file for complete search history.

(56) References Cited

U.S. PATENT DOCUMENTS

| | | |
|---|---|---|
| 1,947,379 A | 2/1934 | Cargill |
| 2,657,831 A | 11/1953 | Pierce |

(Continued)

FOREIGN PATENT DOCUMENTS

| | | |
|---|---|---|
| DE | 19947739 A1 | 4/2001 |
| GB | 716743 A | 10/1954 |

(Continued)

OTHER PUBLICATIONS

Alibaba.com; "Abilene Machine 320724A3 New Replacement Grain Delivery Leveling Auger with AFS for Case IH 1660 1666 1680 1688 2188 2388++ Combines"; https://guide.alibaba.com/shop/abilene-machine-320724a3-new-replacement-grain-delivery-leveling-auger-with-afs-for-case-h-1660-1666-1680-1688-2188-2388-combines_37019464.htm; retrieved on Aug. 16, 2017 (3 pages).

(Continued)

*Primary Examiner* — Anshu Bhatia
(74) *Attorney, Agent, or Firm* — Rebecca Henkel; Rickard DeMille

(57) ABSTRACT

The controller that receives at least one sensor signal indicative of a measured profile of a particulate material within a storage tank of an agricultural system. The controller also determines whether a variation between the measured profile and a target profile is greater than a threshold value. The controller outputs a first output signal to a user interface indicative of instructions to inform an operator of a profile variation, outputs a second output signal to an agitator indicative of activation of the agitator, or a combination thereof, in response to determining that the variation between the measured profile and the target profile is greater than the threshold value.

16 Claims, 8 Drawing Sheets

(51) Int. Cl.
  *B01F 35/22* (2022.01)
  *B01F 35/221* (2022.01)
  *B01F 101/09* (2022.01)

(56) References Cited

U.S. PATENT DOCUMENTS

| | | |
|---|---|---|
| 2,755,002 A | 7/1956 | Gustafson |
| 2,814,421 A | 11/1957 | Buhr |
| 2,826,344 A | 3/1958 | Weber |
| 3,129,828 A | 4/1964 | Lusk |
| 3,180,525 A | 4/1965 | Fabian et al. |
| 3,430,822 A | 3/1969 | Lienemann et al. |
| 3,532,232 A | 10/1970 | Sukup |
| 4,015,366 A | 4/1977 | Hall, III |
| 4,033,466 A | 7/1977 | Easton |
| 4,100,538 A | 7/1978 | Knepler |
| 4,159,064 A | 6/1979 | Hood |
| 4,562,779 A | 1/1986 | Briggs |
| 4,969,583 A | 11/1990 | Torimitsu et al. |
| 5,007,590 A | 4/1991 | Taylor |
| 5,234,128 A | 8/1993 | Hill |
| 5,749,783 A | 5/1998 | Pollklas |
| 6,715,640 B2 | 4/2004 | Tapphorn et al. |
| 6,854,405 B2 | 2/2005 | Memory |
| 7,640,876 B2 | 1/2010 | Memory |
| 7,877,181 B2 | 1/2011 | Chervenka et al. |
| 7,969,319 B2 | 6/2011 | Kowalchuk |
| 8,032,255 B2 | 10/2011 | Phelan et al. |
| 8,380,401 B2 | 2/2013 | Pighi et al. |
| 8,683,930 B2 | 4/2014 | Cresswell et al. |
| 8,931,425 B2 | 1/2015 | Friggstad |
| 9,119,342 B2 | 9/2015 | Bonefas |
| 9,198,343 B2 | 12/2015 | Mariman et al. |
| 9,366,389 B2 | 6/2016 | Stewart et al. |
| 9,392,746 B2 | 7/2016 | Darr et al. |
| 9,481,294 B2 | 11/2016 | Sauder et al. |
| 9,949,435 B2 | 4/2018 | Banks, Jr. et al. |
| 2006/0240884 A1 | 10/2006 | Klimmer |
| 2012/0104032 A1 | 5/2012 | Bahn |
| 2013/0243562 A1 | 9/2013 | Behnke et al. |
| 2014/0196645 A1* | 7/2014 | Friggstad .............. A01C 21/00 111/200 |
| 2014/0350801 A1* | 11/2014 | Bonefas .................. B60R 11/04 701/50 |
| 2016/0150724 A1* | 6/2016 | Browning .............. A01C 15/18 239/672 |
| 2016/0278277 A1 | 9/2016 | Valberg |
| 2016/0339405 A1* | 11/2016 | Bump .................... A01B 76/00 |
| 2017/0135280 A1 | 5/2017 | Rosengren et al. |
| 2019/0230847 A1 | 8/2019 | Forrest et al. |
| 2019/0230848 A1 | 8/2019 | Forrest et al. |

FOREIGN PATENT DOCUMENTS

| | | |
|---|---|---|
| GB | 2026447 A | 2/1980 |
| WO | 2011053286 A1 | 5/2011 |
| WO | 2015023684 A2 | 2/2015 |

OTHER PUBLICATIONS

Dickey-john; "Hopper Level Sensor Aug. 21, 2017; http://www.dickey-john.com/product/hopper-level-sensor" (1 page).

Banner; "Measurement and Level Monitoring" Aug. 21, 2017; https://www.banner-engineering.com/us/en/solutions/measurement-and-level-monitoring.html#all (6 pages).

CNH; "1200 Series Advanced Seed Meter Planters" 2005 (36 pages).

CNH; "1200 Series Advanced Seed Meter Planters; 2005; from http://www.stjosephequipment.com/console/storage/documents/138124483832957.pdt" (36 pages).

Dickey-john; "Hopper Level Sensor; retrieved Jan. 30, 2018 from http://www.dickey-john.com/product/hopperlevel-sensor" (1 page).

Bannner; "Measurement and Level Monitoring" retrieved Jan. 30, 2018 from https://www.bannerengineering.com/us/en/solutions/measurement-and-level-monitoring.html#all (21 pages).

U.S. Appl. No. 15/884,056, Non-Final Office Action dated Dec. 26, 2019, 22 pgs.

U.S. Appl. No. 15/884,056, Non-Final Office Action dated Nov. 19, 2020, 13 pgs.

U.S. Appl. No. 15/884,056, Final Office Action dated Jun. 17, 2020, 12 pgs.

\* cited by examiner

AGITATION CONTROL SYSTEM

BACKGROUND

The present disclosure relates generally to agricultural implements and, more particularly, to storage and metering of a granular agricultural product to ground engaging opener assemblies on agricultural implements.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, agricultural seeding implements are towed behind a work vehicle, such as a tractor. These implements generally contain a particulate material, such as seeds, fertilizer, and/or other agricultural product, which is distributed on or in the ground using various methods. Certain implements include a storage tank in which the particulate material is stored and a metering system configured to meter the particulate material from the storage tank. The particulate material is distributed from the metering system to row units, which are configured to distribute the particulate material on or in the ground. As the storage tank is filled with the particulate material and/or while the particulate material flows from the storage tank to the metering system, the particulate material may create an undesirable profile within the storage tank. Several factors may contribute to this undesirable profile, including, but not limited to, friction between the particulate material and the storage tank, clumping of the particulate material, operation of the implement on a slope, and an inactive portion of the metering system. This undesirable profile may lead to uneven flow to the metering system, which may cause an unwanted distribution or no distribution of the particulate material over certain regions of a field. As a result, the crop yield within these regions may be reduced, thereby reducing the efficiency of the seeding process.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In one embodiment, an agitation control system that includes a controller with a memory and a processor. The controller is configured to receive at least one sensor signal indicative of a measured profile of a particulate material within a storage tank of an agricultural system. The controller also determines whether a variation between the measured profile and a target profile is greater than a threshold value. The controller outputs a first output signal to a user interface indicative of instructions to inform an operator of a profile variation, outputs a second output signal to an agitator indicative of activation of the agitator, or a combination thereof, in response to determining that the variation between the measured profile and the target profile is greater than the threshold value.

In another embodiment, an agitation control system that includes an agitator system with at least one drive system. The system includes at least one sensor disposed above the agitator system. The at least one sensor detects a measured profile of a particulate material within a storage tank of an agricultural system. A controller is communicatively coupled to the at least one sensor. The controller receives at least one sensor signal from the at least one sensor, determines whether a variation between the measured profile and a target profile is greater than a threshold value, and outputs an output signal to the at least one drive system indicative of activation of the agitating system in response to determining that the variation between the measured profile and the target profile is greater than the threshold value.

In another embodiment, a non-transitory computer readable medium with executable instructions. The instructions, when executed by a processor, cause the processor to receive at least one sensor signal indicative of a measured profile of a particulate material within a storage tank of an agricultural system. The processor also determines whether a variation between the measured profile and a target profile is greater than a threshold value. The processor outputs a first output signal to a user interface indicative of instructions to inform an operator of a profile variation, output a second output signal to an agitator system indicative of activation of the agitator, or a combination thereof, in response to determining that the variation between the measured profile and the target profile is greater than the threshold value.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
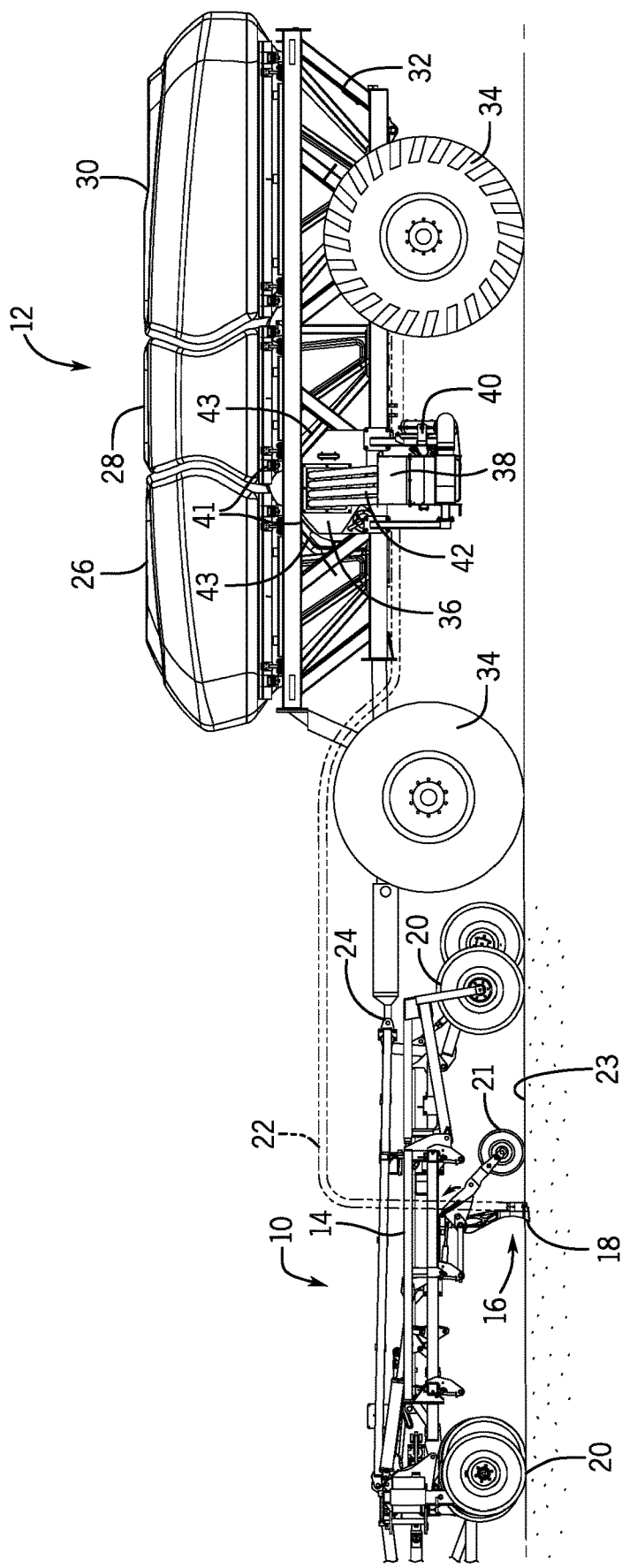
FIG. 1 is a side view of an agricultural implement with an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Certain embodiments of the present disclosure include an agitation control system. Certain agricultural systems (e.g., air carts, implements, etc.) contain a particulate material (e.g., seeds, fertilizer, and/or other agricultural products) within a storage tank of the agricultural system. Certain agricultural systems are coupled to a respective implement and/or include an implement configured to distribute the particulate material within a field. The particulate material may flow from the storage tank through a metering system, which is configured to control the flow of the particulate material to the field. As the storage tank is filled with the particulate material or as the particulate material flows from the storage tank through the metering system, the profile of the particulate material within the storage tank may change.

Accordingly, in certain embodiments, an agitation control system may include at least one sensor, an agitating system having at least one drive system, and a controller. The sensor is configured to detect a profile of particulate material within a storage tank and to output a signal to the controller indicative of the profile. The controller is configured to compare the profile to a target profile. The target profile may be based on the implement type, the particulate material being distributed, the operation being performed, the target distribution of the particulate material within the field, etc. The target profile may also be input by an operator or determined by the controller. If the controller determines that a variation between the measured profile and the target profile is greater than a threshold value, the controller outputs a signal to a user interface indicative of instructions that inform an operator of a profile variation.

Additionally, or alternatively, the controller may output a signal to an agitating system indicative of activation of the agitating system. Activation of the agitating system causes a drive system to move an agitator. As an agitator within the agitating system moves, the particulate material may move from an area where the measured profile is above the target profile to an area where the measured profile is below the target profile. As a result, the variation between the measured profile and the target profile may be below a threshold value, thereby increasing the efficiency of seeding operations. The profile adjusting process may be performed both while particulate material is being distributed to the field and while the storage tank is being filled with the particulate material.

Furthermore, the agitation control system described herein may be installed in both new and existing agricultural systems. Installation of the sensing and agitation control system includes disposing an agitating system in a bottom portion of a storage tank of the agricultural system. The agitating system may be secured to the storage tank via various interface and mounting features, such as fasteners, tab extensions, etc. The agitating system may include a drive system having at least one motor configured to drive an agitator of the agitating system. Alternatively, existing motors within the agricultural system may drive the agitator.

To help illustrate, a side view of an agricultural implement 10 coupled to an air cart 12 is shown in FIG. 1. As depicted, the agricultural implement 10 includes a tool frame 14 coupled to a row unit 16, including an opener 18, and wheel assemblies 20. The agricultural implement may be pulled by an off-road work vehicle (e.g., a tractor) to deposit rows of product. Accordingly, the wheel assemblies 20 may contact the soil surface to enable the agricultural implement 10 to be pulled by the off-road work vehicle. As the agricultural implement 10 is pulled, a row of product may be deposited in the soil by the row unit 16. Although only one row unit 16 is shown, the agricultural implement 10 may include multiple row units 16 organized in a row across the agricultural implement 10. In some embodiments, the agricultural implement 10 may include a row of 12, 14, 16, 18, 20, or more row units 16, which may each deposit a row of seeds.

To facilitate depositing seeds, each row unit 16 includes the opener 18, and in some embodiments a press wheel 21. More specifically, when the opener 18 engages the soil 23, the opener 18 exerts a downward force that excavates a trench into the soil 23 as the row unit 16 travels across the soil 23. As the agricultural implement 10 moves through the field, the row unit 16 may deposit seeds into the excavated trench. Then, the press wheel 21 may pack soil onto the deposited seeds.

The flow rate of seeds from the row unit 16 may be controlled by the rate of seeds from the air cart 12. In some embodiments, the air cart 12 may pneumatically distribute the seeds or other granular agricultural products to the row unit 16 via a primary distribution hose 22. In other words, the air cart 12 may control the seed flow rate from the row unit 16 by controlling the rate at which seeds are supplied to the row unit 16. Additionally, the air cart 12 may supply seeds to multiple ground engaging opener assemblies 18. As such, the air cart 12 may control the seed deposition rate into multiple rows.

In the depicted embodiment, the air cart 12 is towed behind the agricultural implement 10. More specifically, the agricultural implement 10 may be coupled to the off-road work vehicle by a first hitch assembly (not shown), and the air cart 12 may be coupled to the agricultural implement 10 by a second hitch assembly 24. However, in other embodiments, the agricultural implement 10 may be towed behind the air cart 12. In further embodiments, the implement 10 and the air cart 12 may be part of a single unit that is towed behind an off-road work vehicle, or the implement 10 and the air cart 12 may be elements of a self-propelled vehicle.

The air cart 12 may centrally store seeds and distribute the seeds to the ground engaging opener assemblies 18. Accordingly, as depicted, the air cart 12 includes three primary product containers 26, 28, and 30, an air cart frame 32, and wheels 34. Further, the air cart 12 may include a secondary product container 36, a fill hopper 38, an air supply 40 (e.g., fan), and product conveyance conduits 42. The towing hitch 24 is coupled between the tool frame 14 and the air cart frame 32, which enables the air cart 12 to be towed with the agricultural implement 10. Further, the fill hopper 38 enables an operator to fill the secondary product container 36. Accordingly, the fill hopper 38 is located on a side of the air cart 12 and at a level above the soil 23 that facilitates access by the operator (e.g., from ground level or from a bed of a truck). For example, an opening of the fill hopper 38, which receives the granular agricultural product, may be located less than 5 feet (1.5 meters) above the ground. At this height, the operator may load the fill hopper 38 from ground level or from a truck bed, for example.

Additionally, the primary product containers 26, 28, and 30, and the secondary product container 36 may centrally store the granular agricultural product (e.g., seeds, granular fertilizer, granular inoculants, etc.). In some embodiments, the primary product containers 26, 28, and 30 may each include a single large storage compartment for storing a single agricultural product. As illustrated, the primary product containers 26, 28, and 30 may each store a different agricultural product. For example, the primary product container 26 may store legume seeds while the primary product container 28 may store a dry fertilizer. Additionally, in this example, the secondary product container 36 may store granular inoculants, which are planted in conjunction with the legume seeds. In such configurations, the air cart 12 may deliver seed, fertilizer, and inoculant to the implement 10 via separate distribution systems, or as a mixture through a single distribution system.

Further, as illustrated, the secondary product container 36 is positioned beneath portions of the primary product containers 26 and 28, and the secondary product container 36 may include storage for more than 15 bushels of the granular agricultural product. To improve storage capacity of the secondary product container 36, upper walls 41 of the secondary product container 36 have slopes that substantially correspond to respective slopes of bottom portions 43 of the primary product containers 26 and 28. Therefore, the shape of the secondary product container 36 enables the secondary product container 36 to utilize a substantial portion of the space between the primary product containers 26 and 28. Similarly, in an alternative embodiment, the secondary product container 36 could be positioned between the primary product containers 28 and 30.

Figure 2:
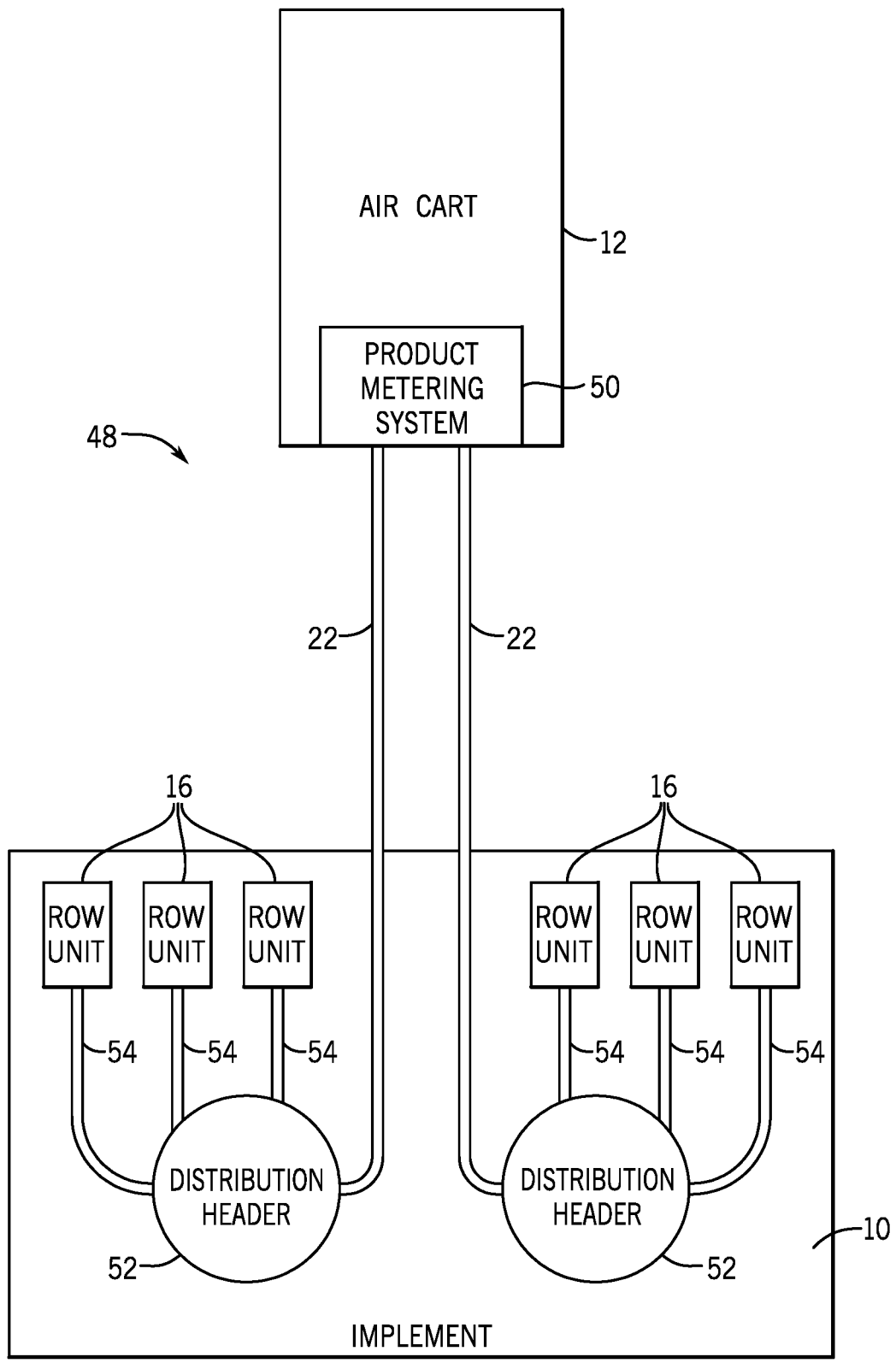
FIG. 2 is a schematic diagram of an air cart coupled to an implement, as shown in FIG. 1, illustrating a metering system including multiple product flow paths, in accordance with an embodiment.

FIG. 2 is a schematic diagram of the air cart 12 coupled to the implement 10, as shown in FIG. 1, illustrating a distribution system 48 including a product metering system 50 and multiple product flow paths. In the illustrated embodiment, the distribution system 48 includes the product metering system 50, the primary distribution hoses 22, distribution headers 52, and secondary distribution hoses 54. The granular agricultural product is delivered from the air cart 12 to the row units 16 using the distribution system 48. For example, the distribution system 48 transfers the agricultural product using the product metering system 50 to primary distribution hoses 22. Subsequently, the primary distribution hoses 22 transfer the agricultural product to the distribution headers 52 positioned on the implement 10. Finally, the distribution headers 52 transfer the product through the secondary distribution hoses 54 to deliver the product to the row units 16 of the implement 10.

The air cart 12 may contain one product or multiple products that are transferred using the distribution system 48. For example, certain distribution systems 48 are configured to mix multiple products, and transfer the products together to the row units 16. Such systems may be known as "single shoot" distribution systems 48. Alternatively, certain distribution systems 48 are configured to transfer product separately to the row units 16. Such systems may be known as "double shoot" systems 48. The air cart 12, as shown in FIG. 2, includes a single shoot distribution system 48. However, other embodiments within the scope of this disclosure may include double shoot distribution systems 48.

The product metering system 50 controls the rate at which product is transferred to the primary distribution hoses 22. For example, the product metering system 50 may contain one or more meter rollers that transfer the product from the air cart 12 to the primary distribution hoses 22. In configurations that employ multiple meter rollers, the meter rollers may be configured to operate collectively or individually. For example, if the implement passes over a swath of soil that is partially planted, the distribution system may activate certain meter rollers to deliver product to row units in the unplanted sections while deactivating other meter rollers to block product delivery to row units in the planted sections. In this manner, the implement may provide a substantially even distribution of product to the soil 23, thereby substantially reducing wasted product associated with double-planting certain areas of the soil 23. A controller may be used to control the operation of the meter rollers. The controller may control whether meter rollers are started or stopped, and/or determine a turn rate for each individual meter roller. In addition, the meter rollers may also contain a holding chamber to provide a steady flow of product to the primary distribution hoses 22. Further, each of the primary product containers 26, 28, and 30, and the secondary product container 36 may have independent product metering systems 50.

The primary distribution hoses 22 are coupled to the product metering system 50 and configured to receive product from the product metering system 50. Although two primary distribution hoses 22 are depicted, any suitable number of hoses may be used. For example, some embodiments may only use one primary distribution hose 22, while other embodiments use 3, 4, 5, 6, 7, 8, 9, 10 or more primary distribution hoses 22. The number and length of primary distribution hoses 22 may be at least partially dependent on the output of an air source, the type of product being used, and/or the configuration of the implement 10 connected to the primary distribution hoses 22.

The distribution headers 52 receive the product from the primary distribution hoses 22. Generally, the number of distribution headers 52 matches the number of primary distribution hoses 22. However, some embodiments may incorporate multiple primary distribution hoses 22 into a single distribution header 52, or one primary distribution hose 22 may be coupled to multiple distribution headers 52. In addition, there may be any suitable number of distribution headers 52. For example, some embodiments may use only one distribution header 52, while other embodiments use 3, 4, 5, 6, 7, 8, 9, 10 or more distribution headers 52. The distribution headers 52 distribute the product along the secondary distribution hoses 54. While three secondary distribution hoses 54 are depicted for each of the distribution headers 52, any suitable number of the secondary distribution hoses 54 may be used.

The secondary distribution hoses 54 provide a flow path for the product to be transferred from the distribution header 52 to the row units 16. Generally there is a secondary distribution hose 54 for each row unit 16. However, there may be multiple secondary distribution hoses 54 going to a single row unit 16, or one secondary distribution hose 54 may provide product to multiple row units 16. For example, a double shoot system, where multiple products are transferred separately, may have multiple secondary distribution hoses 54 going to a single row unit 16.

In certain embodiments, the distribution system 48 enables individual or combined control of product distribution from the air cart 12 to the primary distribution hoses 22. For example, the distribution system 48 may individually stop, start, and/or regulate product delivery rates for each primary distribution hose 22. In addition, the distribution system 48 may block the flow of product when portions of the product metering system 50 are stopped.

Figure 3:
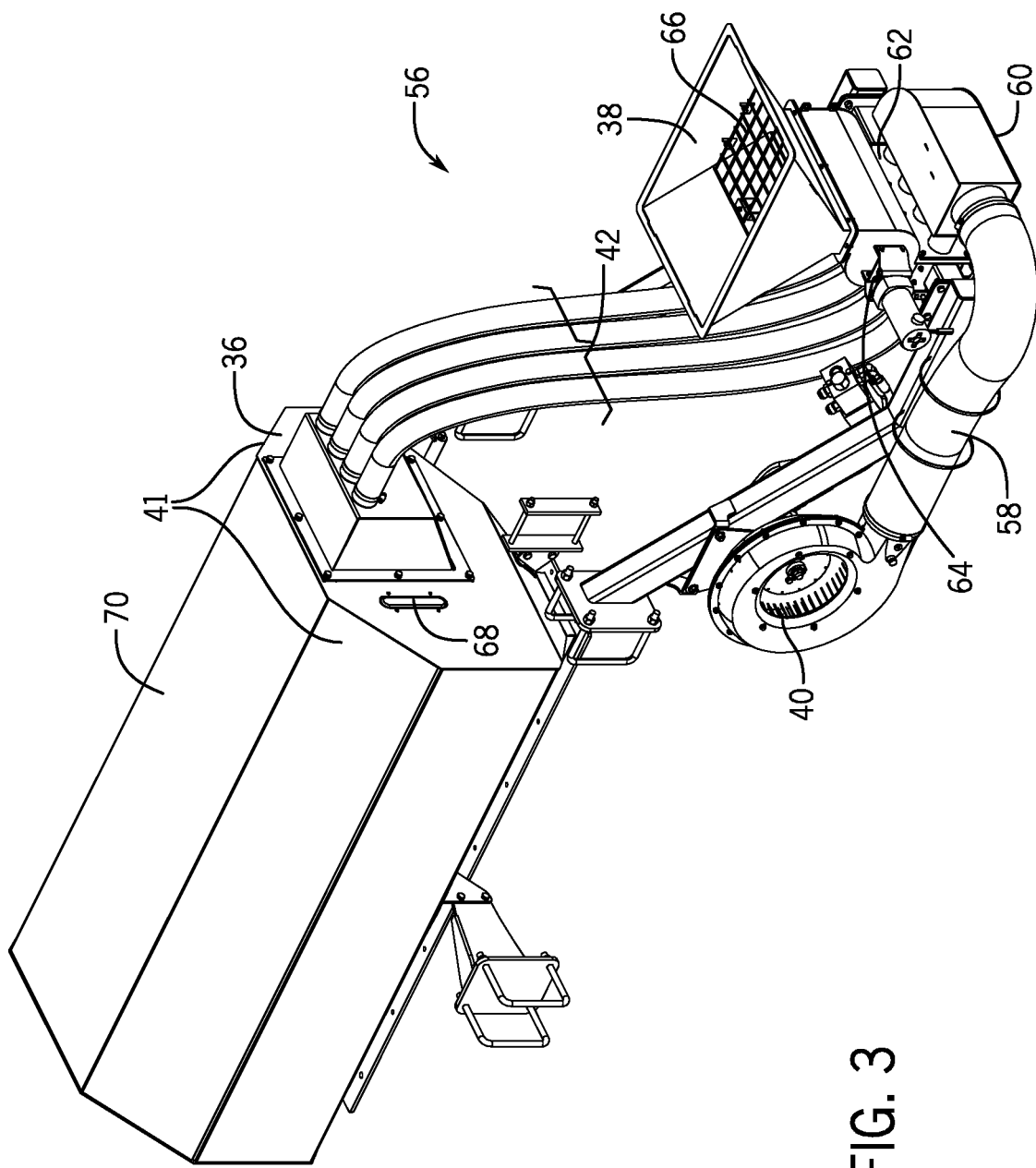
FIG. 3 is a rear perspective view of a secondary product container and a product fill system of the air cart illustrated in FIG. 1, in accordance with an embodiment.

FIG. 3 is a rear perspective view of the secondary product container 36 and a product fill system 56 of the air cart 12. As illustrated, the product fill system 56 includes the fill hopper 38, the air supply 40 (e.g., a fan), an air conveyance hose 58, an air plenum 60, an inductor manifold 62, an air lock 64, and the product conveyance conduits 42. The air supply 40 provides air flow to the air plenum 60 via the air conveyance hose 58. The air plenum 60, in turn, evenly divides the air flow entering the inductor manifold 62. Additionally, a venturi (not shown) is disposed between the air plenum 60 and the inductor manifold 62 and fluidizes the granular agricultural product by drawing the granular agricultural product from the inductor manifold 62 into the air flow. Once the granular agricultural product is fluidized by the venturi, the product conveyance conduits 42 convey the granular product to the secondary product container 36. In another embodiment, the product fill system 56 may also include other pneumatic systems configured to convey the granular agricultural product to the secondary product container 36.

To facilitate filling the secondary product container 36, the fill hopper 38 is loaded with the granular agricultural product as the air supply 40 provides the air flow to the product fill system 56. The fill hopper 38, as illustrated, includes a grate 66 over an opening of the fill hopper 38. The grate 66 is configured to block large objects from entering the product fill system 56. For example, the grate 66 may break up portions of the granular agricultural product that are clumped together, thereby facilitating a substantially continuous flow of product into the product fill system 56. Further, the grate 66 may block unwanted foreign objects, such as rocks or other large debris, from entering the secondary product container 36. While the grate 66 is employed in the present embodiment, it may be appreciated that some alternative embodiments of the present disclosure may not include the grate 66.

Once the granular agricultural product enters the fill hopper 38, the air lock 64 provides the granular agricultural product to the inductor manifold 62. The air lock 64 may be a rotary air lock that meters the granular agricultural product from the fill hopper 38 to the inductor manifold 62 while substantially blocking air flow from the product fill system 56 into the fill hopper. By metering the granular agricultural product into the inductor manifold 62, e.g., by controlling a rate of rotation of the air lock 64, the possibility of overfilling the inductor manifold 62 may be substantially reduced or eliminated. For example, the product fill system 56 may fill the secondary product container 36 at a rate of about 2 bushels per minute (e.g., of canola seed). Accordingly, the rate of rotation of the air lock 64 may likewise provide 2 bushels of the granular agricultural product (e.g., canola seed) per minute to the inductor manifold 62 for fluidization and transport to the secondary product container 36.

As the air lock 64 meters the granular agricultural product into the inductor manifold 62, the air flow through the venturi draws the granular agricultural product from the inductor manifold 62. The air flow then fluidizes the granular agricultural product, thereby enabling the product to flow through the product conveyance conduits 42 into the secondary product container 36. As the granular agricultural product flows into the secondary product container 36, a sight glass 68, which may be disposed on a side of the secondary product container 36, enables an operator to track remaining capacity of the secondary product container 36. The sight glass 68 may provide an indication to the operator of when to stop filling the secondary product container 36. For example, when the sight glass 68 is completely covered by the granular agricultural product, the operator may stop providing product to the fill hopper 38. In other embodiments, there may be a sensor disposed within the secondary product container 36, or within the product fill system 56, that may likewise indicate the fill level of the secondary product container 36 or indicate when to stop filling the fill hopper 38.

Figure 4:
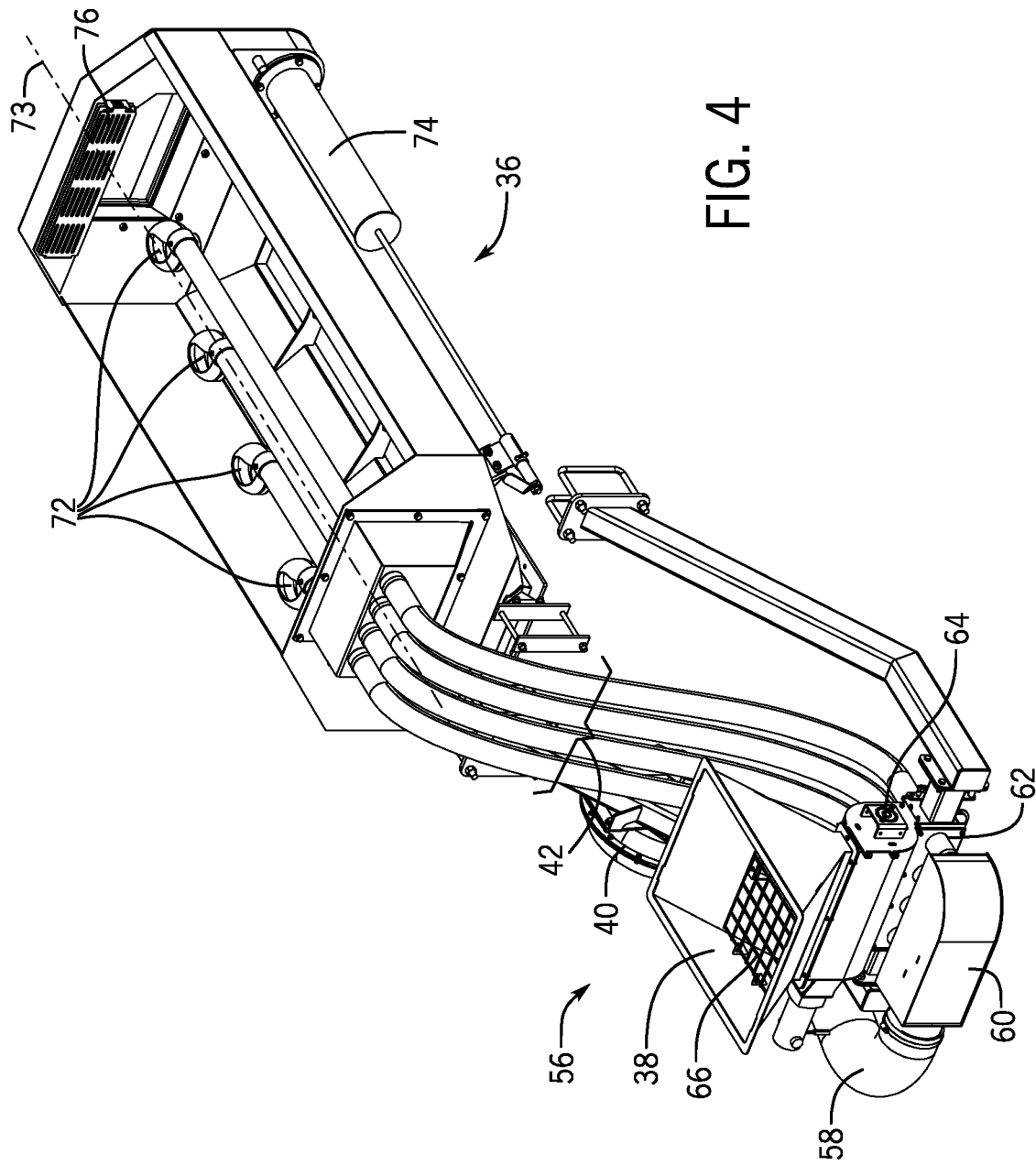
FIG. 4 is a front perspective view of the secondary product container with a top removed for clarity and the product fill system of the air cart illustrated in FIG. 1, in accordance with an embodiment.

FIG. 4 is a front perspective view of the product fill system 56 and the secondary product container 36 with the top 70 of the secondary product container 36 of FIG. 3 removed for clarity. As illustrated, the product conveyance conduits 42 feed the granular agricultural product to a series of cyclones 72 within the secondary product container 36. The cyclones 72 are configured to deposit the granular agricultural product within the secondary product container 36. However, the deposition of the granular agricultural product may be unevenly distributed in the secondary product container 36. For example, the cyclones 72, which terminate at different distances along a lateral axis 73, may deposit different amounts of the granular agricultural product at different locations within the secondary product container 36.

After the granular agricultural product is deposited within the secondary product container 36, the air flow exits the secondary product container 36 via an exhaust 74. The exhaust 74 may take the form of any device configured to maintain the granular agricultural product within the secondary product container 36 while enabling excess pressure within the secondary product container 36, e.g., resulting from the continuous flow of air into the secondary product container 36, to exhaust. In the illustrated embodiment, media screens 76 on a rear wall of the secondary product container 36 maintains the granular agricultural product within the secondary product container 36 while enabling the excess air to exit the secondary product container 36 through the exhaust 74.

Figure 5:
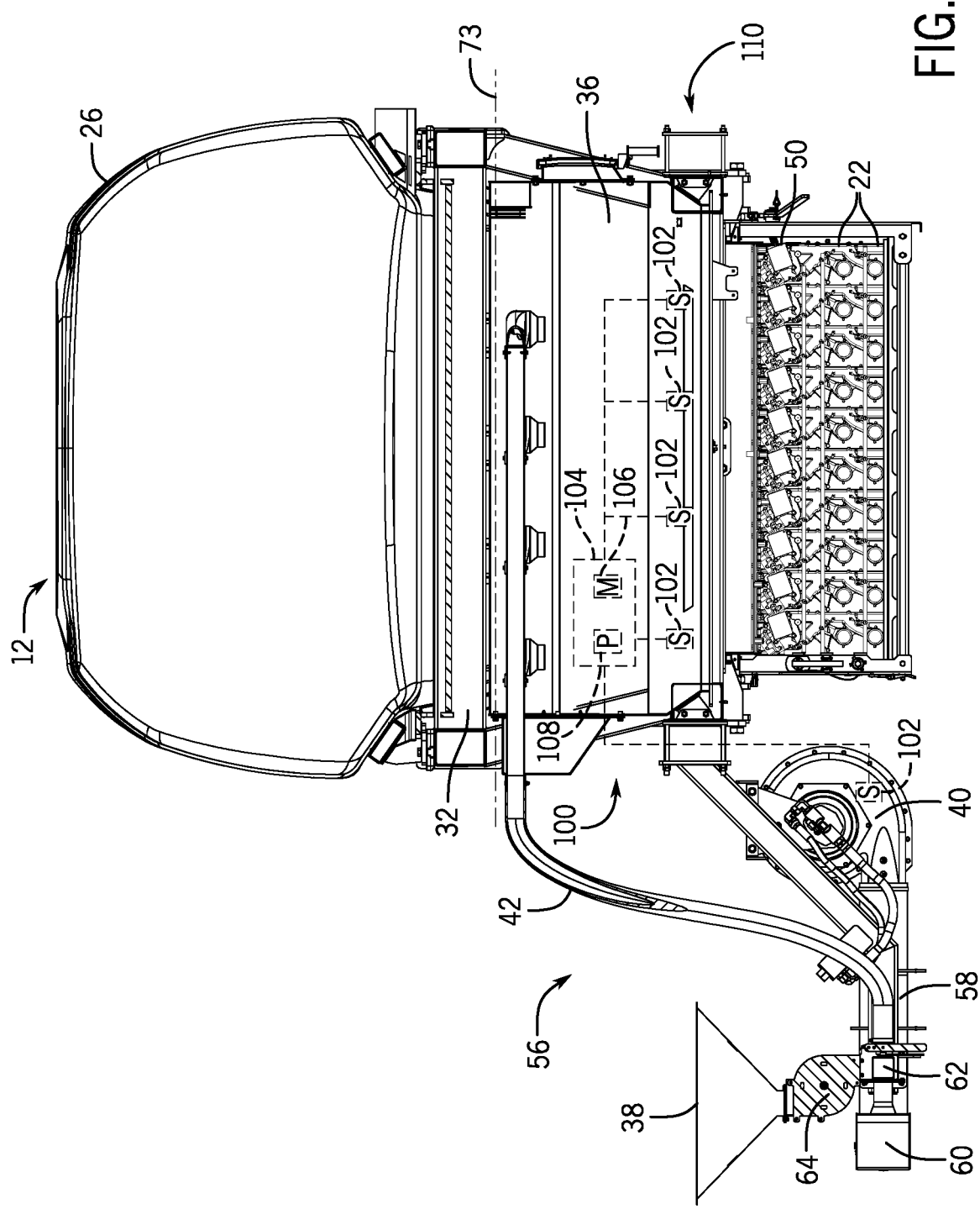
FIG. 5 is a front view of the air cart illustrated in FIG. 1, in accordance with an embodiment.

FIG. 5 is a front view of the air cart 12. As illustrated, a product metering system 50 is coupled to the secondary product container 36. The product metering system 50 may include at least one meter roller assembly, which meters the granular agricultural product from the secondary product container 36 to the primary distribution hoses 22, as discussed above with reference to FIG. 2. Further, as illustrated, the meter rollers may span a bottom of the secondary product container 36 to provide metering of the granular agricultural product across a substantial portion of a lateral extent of the secondary product container 36. In this manner, the product metering system 50 may provide product directly into several of the primary distribution hoses 22. In another embodiment, the product metering system 50 may include a single meter roller. Additionally, the single meter roller may meter granular agricultural product into a single distribution hose 22 or into multiple distribution hoses 22.

Once the granular agricultural product is metered from the secondary product container 36 via the product metering system 50, the granular agricultural product may be conveyed via the primary distribution hoses 22 to the agricultural implement 10, as discussed above with reference to FIG. 1. Further, while the illustrated product metering system 50 includes multiple meter rollers coupled to the bottom of the secondary product container 36, it may be appreciated that the meter rollers may be replaced with any other suitable metering mechanism. Furthermore, it may be appreciated that the product metering system 50 and the primary distribution hoses 22 may be positioned beneath the primary product containers 26, 28, and 30 and between the wheels 34, seen in FIG. 1.

As explained above, the deposition of the granular agricultural product may be unevenly distributed in the secondary product container 36. For example, the secondary fill tank 36 may be filled while on uneven ground. Accordingly, the air cart 12 includes an agitation control system 100 that facilitates leveling of the granular agricultural product within the secondary product container 36. As will be explained in detail below, the agitation control system 100 includes one or more sensors 102 that communicatively couple to a controller 104. The controller 104 includes one or more memories 106 and one or more processors 108 that execute instructions stored on the one more memories to control an agitator(s) 110. The controller 104 controls the agitator 110 in response to the feedback from the sensors 102. For example, feedback from the sensors 102 may indicate that the granular agricultural product is unevenly distributed within the secondary product container 36.

In some embodiments, the sensors 102 may also detect operation of the air supply 40 (e.g., pressure sensor, rotation sensor, fan motor sensor, or a combination thereof). Detecting operation of the air supply 40 may indicate filling of the tank with granular product and/or recent cessation of a filling operation. Accordingly, by monitoring the sensors 102 the controller 104 may determine that the secondary product container 36 is being filled or was recently filled with granular product. The controller 104 may therefore activate the agitator 110 to level the granular agricultural product while filling and/or after filling the secondary product container 36 in order to level the granular agricultural product within the secondary product container 36.

Figure 6:
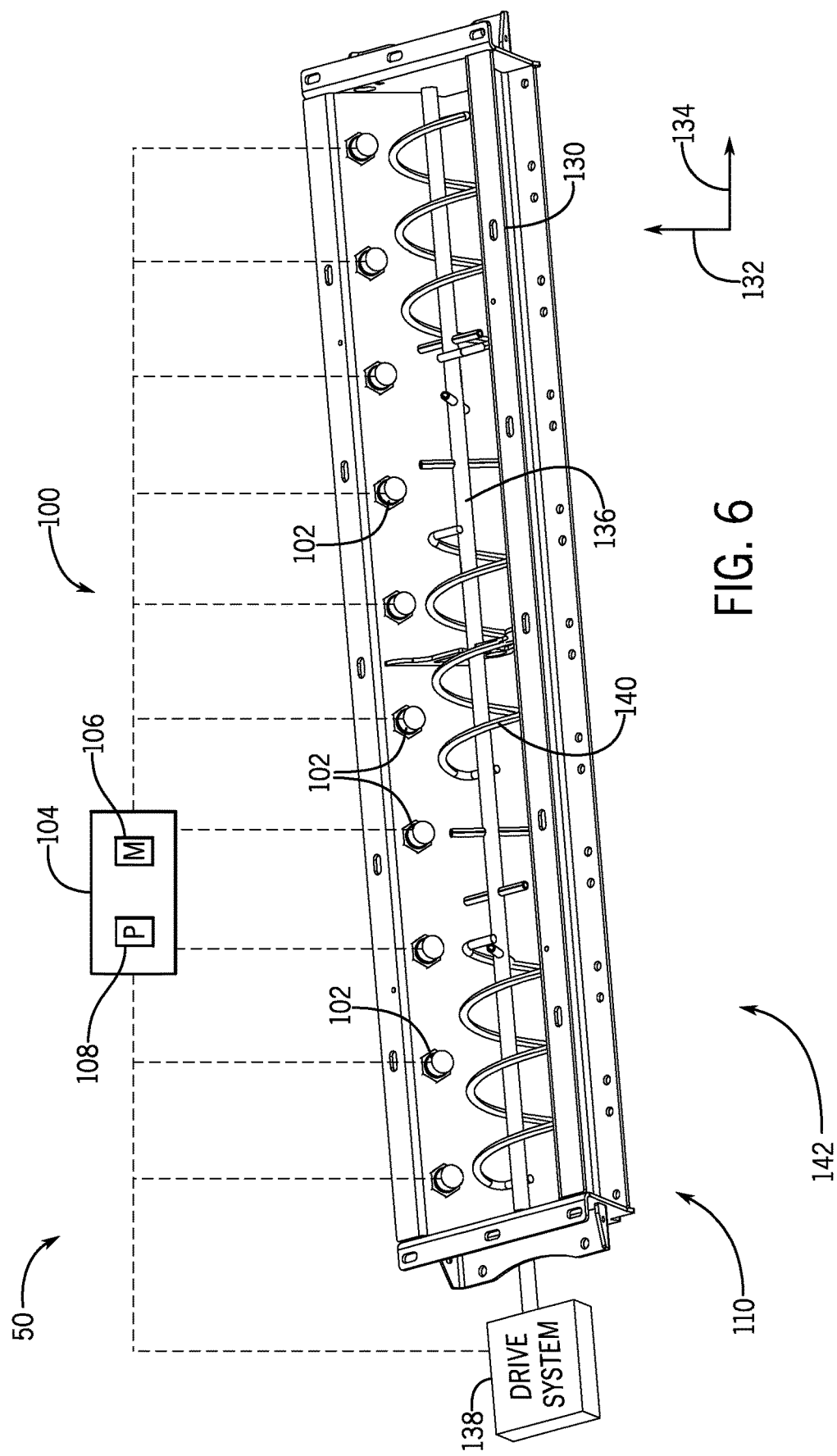
FIG. 6 is a top perspective view of an agitation control system, in accordance with an embodiment.

FIG. 6 is a top perspective view of the agitation control system 100. As illustrated, ten sensors 102 are placed along a wall of the hopper 130 (e.g., along the longitudinal axis 134). However, more or fewer sensors may be employed in alternative embodiments. For example, certain embodiments may include 1, 2, 3, 4, 6, 8, 10, 12, 14, or more sensors 102. In some embodiments, the sensors 102 are configured to detect and measure a profile of particulate material disposed in the agitation control system 100 and/or storage tank before, during, and/or after seeding operations. The measured profile is the shape of the particulate material disposed in the hopper 130 and/or secondary product container 36 (e.g., tank) and may be one-dimensional or two-dimensional. Additionally, the measured profile consists of a series of levels in which each level spans the width of the hopper 130. For example, each sensor may detect a level of the top surface of particulate material in the hopper and/or storage tank. A measured profile may be determined based on the series of detected levels of particulate material.

A variety of sensor(s), such as ultrasonic sensor(s), electrostatic sensor(s), inductive sensor(s), Light Detection and Ranging (LIDAR) sensor(s), load sensors and/or other suitable sensor(s) may be used alone or in combination with one another to detect the measured profile of the particulate material. The sensor(s) may also be a camera disposed in the hopper and/or storage tank. The camera may be configured to detect the measured profile. As illustrated in FIG. 6, the sensors 102 are aligned in a row in the hopper 130. However, the sensors 102 may be disposed in other suitable configurations/arrangements. For example, the sensors 102 may be disposed higher in the secondary product container 36 (e.g., disposed above the hopper 130 (e.g., along the vertical axis 132)).

An agitator 110 is disposed within the hopper 130 along the longitudinal axis 134 and may be placed below the sensors 102 relative to the vertical axis 132. As the particulate material rests in the storage tank, the particulate material may clump together to form pieces that are larger than desired (e.g., larger than the openings in the metering system). As such, when the particulate material flows through the agitator 110, the clumps of particulate material break into smaller pieces more suitable for flowing through the product metering system 50. The agitator 110 includes a shaft 136 that couples to a drive system 138 and a wrapped wire 140 coupled to the shaft 136. The wrapped wire 140 is wrapped around the shaft 136 (e.g., in a cylindrical form, conical form, helical form, etc.) and enables the particulate material to flow between the shaft 136 and the wrapped wire 140. In the illustrated embodiment, the shaft 136 rotates, which rotates the wire 140 to move particulate material in the hopper 130 and/or storage tank. In certain embodiments, other types of agitators may be used in the agitating system 142. For example, an agitator may move linearly in the hopper 130 to move the particulate material.

The drive system 138 of the agitation control system 100 may be configured to turn the agitator 110. The drive system 138 may be a motor configured to turn an agitator 110 (e.g., an electric motor, hydraulic motor, etc.). In the illustrated embodiment, the drive system 138 includes a single motor disposed at an end of the hopper 130, however, the drive system may include more than one motor (e.g., 2, 3, 4, 5, etc.). For example, the drive system 138 may include a motor disposed at each end of the hopper 130. The drive system 138 may also include motor(s) disposed along the length of the hopper 130. Motor(s) disposed along the length of the hopper 130 may be connected to the agitator 110 and may be configured to drive the agitator 110. As the agitator 110 turns, the particulate material moves within the hopper 130. Further, the agitator 110 may be mounted higher in the storage tank relative to the hopper 130. For example, the agitator 110 may be disposed above the hopper 130.

In the illustrated embodiment, the agitator 110 includes a single agitator 110. In certain embodiments, multiple agitators (e.g., 2, 3, 4, 5, 6, 7, 8, etc.) may be disposed in the hopper 130 and/or storage tank. The agitators may be disposed in series or in parallel. In a configuration with more than one agitator, drive system(s) may drive only a portion of the agitators or all the agitators to move the particulate material in one or more directions. Multiple agitators may also be disposed at different levels in the hopper 130 and/or storage tank. For example, one or more agitator(s) may be disposed in the hopper 130 and one or more agitator(s) may be disposed higher in the storage tank.

Figure 7:
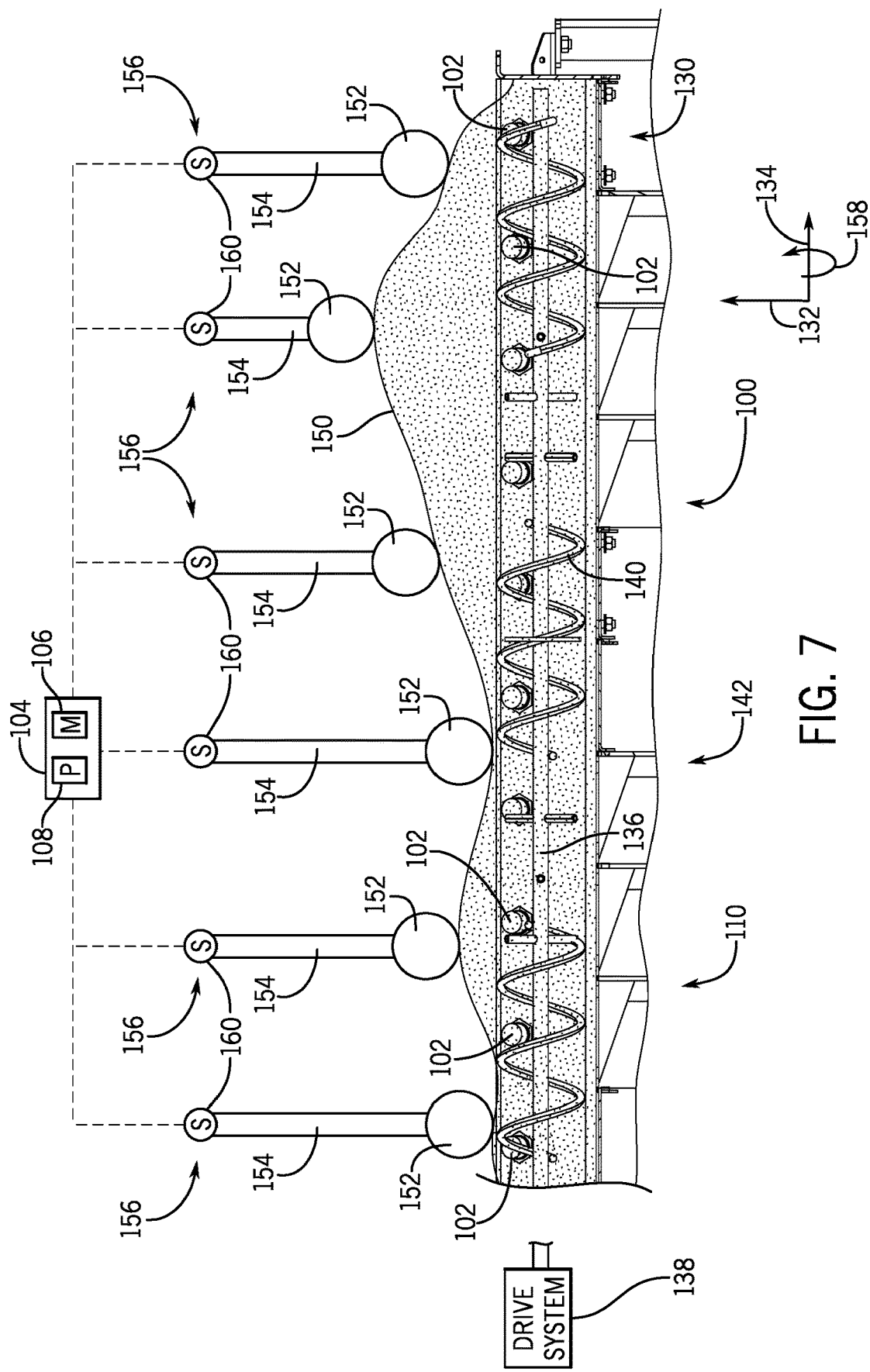
FIG. 7 is a side view of an agitation control system with particulate material disposed therein, in accordance with an embodiment.

FIG. 7 is a side view of the agitation control system 100 with particulate material disposed therein. The particulate material 150 is disposed at various levels along the longitudinal axis 134 of the hopper 130, thereby establishing a profile. The particulate material 150 may be disposed above, below, partially above, and partially below the sensors 102. The sensors 102 may detect a profile of the particulate material 150 based on the position of the particulate material relative to the sensors 102. In the illustrated embodiment, the agitation control system 100 includes multiple sensors 102, each of which may be configured to detect a vertical level or amount (e.g., weight) of the particulate material 150 proximate to the sensor (e.g., material height along the vertical axis 132). From the detected levels of particulate material 150, a measured profile may be established (e.g., by linearly extrapolating the data points or by another suitable method). Alternatively, a single sensor may be used alone or in combination with other sensors to detect a profile of the particulate material 150. For example, a single LIDAR sensor, camera, or ultrasonic sensor (e.g., mounted near a top portion of the storage tank) may be configured to detect the profile.

Furthermore, the sensors 102 may also be used to detect levels of particulate material in the storage tank. An operator may desire to know the amount of particulate material remaining in the storage tank of an agricultural system, and the sensors 102 may be configured to detect the particulate material within the storage tank. In this manner, information regarding the particulate material level in the storage tank and the profile proximate to the hopper 130 may be collected and made available to the operator.

As illustrated in FIG. 7, the particulate material 150 is disposed in the hopper 130 below the far left sensor 102. The sensors 102 may detect that the measured profile of the particulate material 150 is disposed below the far left sensor 102 and above the remaining sensors 102. In some embodiments, the agitation control system 100 may include floats 152 that enable the controller to detect a profile of the particulate material. The floats 152 rest on top of the particulate material 150, and as the tank fills with particulate material 150, the particulate material 150 lifts the floats 152 in direction 132. The floats 152 may couple to arms 154 that rotate about respective pivot points 156 (e.g., hinges coupled to walls of the tank) in direction 158. The arms 154 rotate in response to changes in the position of the floats 152 as the depth of the particulate material 150 under the floats 152 changes. As the arms 154 rotate in direction 158 about the pivot points 156, sensors 160 detect the rotation of the arms 154 and thus the position of the floats 152. The controller 104 receives this information from the sensors 160 and determines a profile of the particulate material 150. The number of floats 152 may vary depending on the embodiment (e.g., 1, 2, 3, 4, 5, 6, or more). Furthermore, instead of fixed length arms 154, the arms 154 may be telescoping arms that increase and decrease in length depending on the depth of the particulate material 150. For example, the telescoping arms may couple to a ceiling of the tank. The sensors 160 may therefore measure a change in the length of the telescoping arm to determine the profile of the particulate material 150.

In some embodiments, the agitation control system 100 may compare the measured profile to a target profile. If a variation between the measured profile and the target profile is greater than a threshold value, the agitation control system 100 will cause the agitator 110 to activate and move particulate material toward the far left side of the hopper 130. Accordingly, the agitation control system 100 may decrease the variation between measured profile and the target profile. The target profile may be a one-dimensional or two dimensional profile and may consist of a series of levels in which each level spans the width of the hopper and/or storage tank. When the measured profile is compared to the target profile, individual corresponding levels of the measured profile and target profile are compared.

The target profile may also span all or a portion of the length of the hopper and/or storage tank. For example, if all of the seed rollers in a metering system are operating, the target profile may be consistent and/or flat across the entire hopper. In other embodiments, if only a portion of the seed rollers are active, the target profile may vary. For example, the target profile may be at a consistent first level over the active seed rollers and at a consistent second level over the non-active seed rollers. The target profile above the non-active seed rollers would essentially be zero. Accordingly, the particulate material sensing and agitation control system 100 may move particulate material from an area above non-active seed rollers to an area above active seed rollers.

The threshold value may be any value selected by an operator and/or determined by the particulate material sensing and agitation control system 100 (i.e., 1 centimeter (cm), 2 cm, 3 cm, 4 cm, 5 cm, 10 cm, 50 cm, 100 cm, etc.). The threshold value may depend on the type of particulate material, the type of agricultural system, etc. being used. If a variation between a measured profile level and the corresponding target profile level exceeds the threshold value, the particulate material sensing and agitation control system 100 responds by reducing the variation. The variation is the difference between the measured profile level and a corresponding target profile level.

The particulate material sensing and agitation control system 100 may also only operate when the measured level of particulate material reaches a particular level in the storage tank. For example, the particulate material sensing and agitation control system 100 may operate once the level of particulate material is at a level of one third of the storage tank capacity. An operator may choose to set this level to control operation of the particulate material sensing and agitation control system 100.

After the measured profile of particulate material is determined, the operator may be notified of a variation between the measured profile and a target profile of the particulate material, and the particulate material sensing and agitation control system 100 may automatically take action to move the particulate material to decrease the difference between the measured profile and the target profile.

Figure 8:
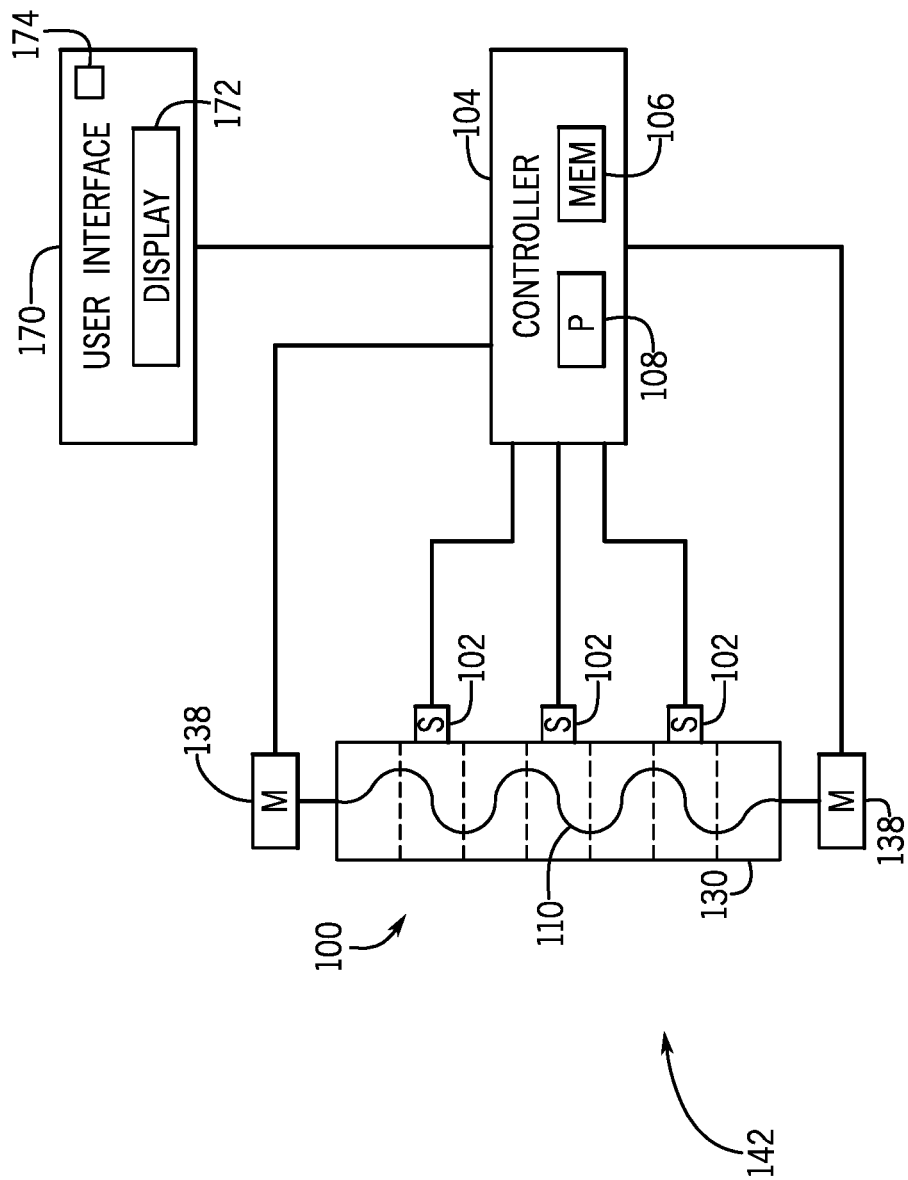
FIG. 8 is a block diagram of an embodiment of an agitation control system that may be employed within the air cart of FIG. 1, in accordance with an embodiment.

FIG. 8 is a block diagram of an embodiment of a particulate material sensing and agitation control system 100 that may be employed within the air cart of FIG. 1. The sensors 102 may detect a measured profile of the particulate material in the hopper 130. Signals corresponding to the measured profile may be output from the sensors 102 to a controller 104. In certain embodiments, the controller 104 is an electronic controller and includes the processor 108 and the memory 106. The controller 104 may also include one or more storage devices and/or other suitable components. Data included in the signals corresponding to the measured profile may be stored in the memory 106 of the controller 104. Additionally, data corresponding to a target profile may be stored in the memory 106. The target profile may be entered by the operator before or during operation of the agricultural system or may be determined based on data stored in the memory device 106.

The memory 106 may include a volatile memory, such as random access memory (RAM), and/or a nonvolatile memory, such as read-only memory (ROM). The memory 106 may store a variety of information and may be used for various purposes. For example, the memory 106 may store processor-executable instructions (e.g., firmware or software) for the processor 108 to execute, such as instructions for controlling the drive system 138. The storage device(s) (e.g., nonvolatile storage) may include ROM, flash memory, a hard drive, or any other suitable optical, magnetic, or solid-state storage medium, or a combination thereof. The storage device(s) may store data (e.g., the target profile of the particulate material, the number of rotations to turn an agitator 110, or the like), instructions (e.g., software or firmware for controlling the drive system 138), and any other suitable data. The processor 108 and/or memory device 106, and/or an additional processor and/or memory device, may be located in any suitable portion of the system. For example, a memory device for storing instructions (e.g., software or firmware for controlling portions of the drive system 138) may be located in or associated with the drive system 138.

In the illustrated embodiment, the controller 104 also includes a processor 108, such as a microprocessor. The processor 108 may be used to execute software, such as software for controlling the drive system 138. Moreover, the processor 108 may include multiple microprocessors, one or more "general-purpose" microprocessors, one or more special-purpose microprocessors, and/or one or more application specific integrated circuits (ASICS), or some combination thereof. For example, the processor 108 may include one or more reduced instruction set (RISC) or complex instruction set (CISC) processors.

If a variation between the measured profile of the particulate material and the target profile is greater than a threshold value, the controller 104 may send a signal to a user interface 170 indicative of instructions to inform an operator of a profile variation. In the illustrated embodiment, the user interface 170 includes a display 172, which may present information to an operator, including an indication that the variation between the measured profile and the target profile is greater than the threshold value. The display 172 may also be configured to present a graphical representation of the measured profile, the target profile, the threshold value, or a combination thereof. Based upon this display of information, the operator may activate the agitator 110 to decrease the variation between the measured profile and the target profile. For example, in the illustrated embodiment, the user interface 170 includes a user interaction device 174, such as button(s), or a touch screen, that may send a signal to the drive system 138 indicative of activation of the agitator 110. If the particulate material level is low at one portion of the hopper 130, the operator may select an operation of the agitator 110 to control movement of the particulate material to that portion of the hopper 130.

Moreover, the agitator 110 may move in either direction to move the particulate material. For example, if the particulate material is low in a portion of the hopper, such as at an end of the hopper, the operator may select a particular direction for the agitator 110 to move. Accordingly, the agitator 110 may move the particulate material to any portion of the hopper 130. Further, if more than one agitator 110 is included, a drive system may be coupled to each agitator thereby enabling the direction of rotation of each agitator to be independently controllable.

Further, the agitator(s) in the agitating system 142 may change direction and may move in the same and/or opposite directions. For example, if a single agitator is used in the particulate material sensing and agitation control system 100, the agitator 110 may move in multiple directions to agitate and move the particulate material. The agitator 110 may rotate in a first direction to move the particulate material and then in a second direction as required. In embodiments using multiple agitators, the agitators may move in the same direction to move particulate material to a particular portion of the hopper or may move in opposite directions to move the particulate material. For example, an agitator may be disposed at each end of a hopper 130. As particulate material flows through the hopper 130, the variation between the measured profile level of particulate material and target profile level may exceed a threshold value at each end of the hopper 130. In this example, the agitators disposed at each end may rotate in opposite directions to move the particulate material toward each end of the hopper 130.

The controller 104 may also output signals to the drive system 138 indicative of activation of the agitator 110 in response to determining that the variation between the measured profile and the target profile is greater than the threshold value. Based on the signal from the controller 104, the drive system 138 may drive the agitator to decrease the variation between the measured profile and target profile of particulate material. In another embodiment, the drive system 138 may be connected to two or more agitators and may drive only a portion of the agitators or all of the agitators of the agitating system 142 to decrease the variation between the measured profile and target profile of the particulate material. For example, if a variation between the measured profile and target profile exists in a portion of the hopper 130 where only one agitator is disposed, the drive system 138 may drive that agitator to move particulate material toward that portion of the hopper 130.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agitation control system, comprising:
a controller comprising a memory and a processor, wherein the controller is configured to:
receive at least one sensor signal indicative of a measured profile of a particulate material within a storage tank/hopper system of an agricultural system, wherein the measured profile corresponds to a distribution of the particulate material within the storage tank/hopper system;
determine whether a variation between the measured profile and a target profile is greater than a threshold value; and
output an output signal to an agitator system having an agitator within the storage tank/hopper system indicative of activation of the agitator system in response to determining that the variation between the measured profile and the target profile is greater than the threshold value.

2. The agitation control system of claim 1, comprising at least one sensor communicatively coupled to the controller and configured to output the at least one sensor signal.

3. The agitation control system of claim 2, wherein the at least one sensor comprises a plurality of sensors.

4. The agitation control system of claim 3, wherein a first sensor of the plurality of sensors is configured to be disposed at a middle portion of the storage tank/hopper system, a second sensor of the plurality of sensors is configured to be disposed at a first end of the storage tank/hopper system, and a third sensor of the plurality of sensors is configured to be disposed at a second end of the storage tank/hopper system.

5. The agitation control system of claim 1, wherein the measured profile comprises a plurality of measured levels of the particulate material across the storage tank/hopper system, and the target profile comprises a corresponding plurality of target levels of the particulate material across the storage tank/hopper system.

6. The agitation control system of claim 5, wherein the variation corresponds to one of the plurality of measured levels being lower than a corresponding one of the plurality of target levels.

7. The agitation control system of claim 2, wherein the at least one sensor is an ultrasonic sensor, a capacitance sensor, an electrostatic sensor, a LIDAR sensor, a camera, rotation sensor, load sensor, rotation sensor, position sensor, pressure sensor, or a combination thereof.

8. The agitation control system of claim 1, wherein the controller is configured to output another output signal to a user interface indicative of instructions to inform an operator of a profile variation.

9. The agitation control system of claim 1, wherein activation of the agitator system causes the agitator of the agitator system to move the particulate material.

10. An agitation control system, comprising:
  an agitator system comprising at least one drive system and an agitator driven by the at least one drive system, wherein the agitator is configured to be positioned within a storage tank/hopper system of an agricultural system over a product metering system and configured to distribute a particulate material across the product metering system;
  at least one sensor disposed above the agitator, wherein the at least one sensor is configured to detect a measured profile of the particulate material within the storage tank/hopper system, wherein the measured profile corresponds to a distribution of the particulate material within the storage tank/hopper system; and
  a controller communicatively coupled to the at least one sensor and configured to:
    receive at least one sensor signal from the at least one sensor;
    determine whether a variation between the measured profile and a target profile is greater than a threshold value; and
    output an output signal to the at least one drive system indicative of activation of the agitator system in response to determining that the variation between the measured profile and the target profile is greater than the threshold value.

11. The agitation control system of claim 10, wherein the at least one sensor comprises a plurality of sensors.

12. The agitation control system of claim 11, wherein at least one sensor of the plurality of sensors is disposed above a respective meter roller of the product metering system.

13. The agitation control system of claim 10, wherein the at least one sensor is an ultrasonic sensor, a capacitance sensor, an electrostatic sensor, a LIDAR sensor, a camera, rotation sensor, load sensor, rotation sensor, position sensor, pressure sensor, or a combination thereof.

14. The agitation control system of claim 10, wherein the measured profile comprises a plurality of measured levels of the particulate material across the storage tank/hopper system, and the target profile comprises a corresponding plurality of target levels of the particulate material across the storage tank/hopper system.

15. The agitation control system of claim 14, wherein the variation corresponds to one of the plurality of measured levels being lower than a corresponding one of the plurality of target levels.

16. The agitation control system of claim 11, wherein a first sensor of the plurality of sensors is configured to be disposed at a middle portion of the storage tank/hopper system, a second sensor of the plurality of sensors is configured to be disposed at a first end of the storage tank/hopper system, and a third sensor of the plurality of sensors is configured to be disposed at a second end of the storage tank/hopper system.

* * * * *